United States Patent [19]
Obrist et al.

[11] 4,349,399
[45] Sep. 14, 1982

[54] METHOD AND APPARATUS FOR SHRINKING A CONTAINER CLOSURE

[75] Inventors: Albert Obrist, Kaiseraugst; Max Blaesi, Reinach, both of Switzerland; Serge Auer, Riedisheim, France

[73] Assignee: Albert Obrist AG, Reinach, Switzerland

[21] Appl. No.: 247,778

[22] Filed: Mar. 26, 1981

[30] Foreign Application Priority Data

Mar. 28, 1980 [CH] Switzerland ........................ 2452/80

[51] Int. Cl.$^3$ ........................ B29C 27/12; B32B 31/26

[52] U.S. Cl. ........................................ 156/86; 29/429; 29/447; 53/441; 53/442; 156/497; 156/499; 156/DIG. 15; 156/DIG. 36; 215/1 C; 215/246; 264/230; 264/342 R; 432/121; 432/128

[58] Field of Search ..................... 156/84, 85, 86, 497, 156/499, DIG. 6, DIG. 7, DIG. 8, DIG. 9, DIG. 12, DIG. 14, DIG. 15, DIG. 26, DIG. 36, DIG. 38, DIG. 43, DIG. 51; 264/230, 342 R; 174/DIG. 8; 215/1 R, 1 C, 232, 246; 53/441, 442; 29/447, 775, 429; 432/10, 11, 121, 124, 128, 144, 146

[56] References Cited

U.S. PATENT DOCUMENTS 3,309,835 3/1967 Peppler ................................ 53/442
3,578,536 5/1971 Peck et al. ......................... 156/497
4,011,122 3/1977 Ashcroft .............................. 156/86
4,172,873 10/1979 Spicer ................................. 156/86

FOREIGN PATENT DOCUMENTS 834605 5/1960 United Kingdom ................. 53/442

*Primary Examiner*—Caleb Weston
*Attorney, Agent, or Firm*—William R. Hinds

[57] ABSTRACT

In a method of shrinking screw caps (2) on to the mouths (1) of containers (13), the screw caps are acted upon by a hot gas jet (7, 8) from nozzles (3, 4), along a feed path (6), from both sides. The flow axes (7, 8) are displaced relative to each other so that there are no pressure build-up and stagnation effects. The resulting advantageous temperature pattern at the nozzles means that savings in heating output can be attained. In addition, there is no longer any need for the bottles to be rotated about their own axis (10).

10 Claims, 2 Drawing Figures

METHOD AND APPARATUS FOR SHRINKING A CONTAINER CLOSURE

Figure 1:
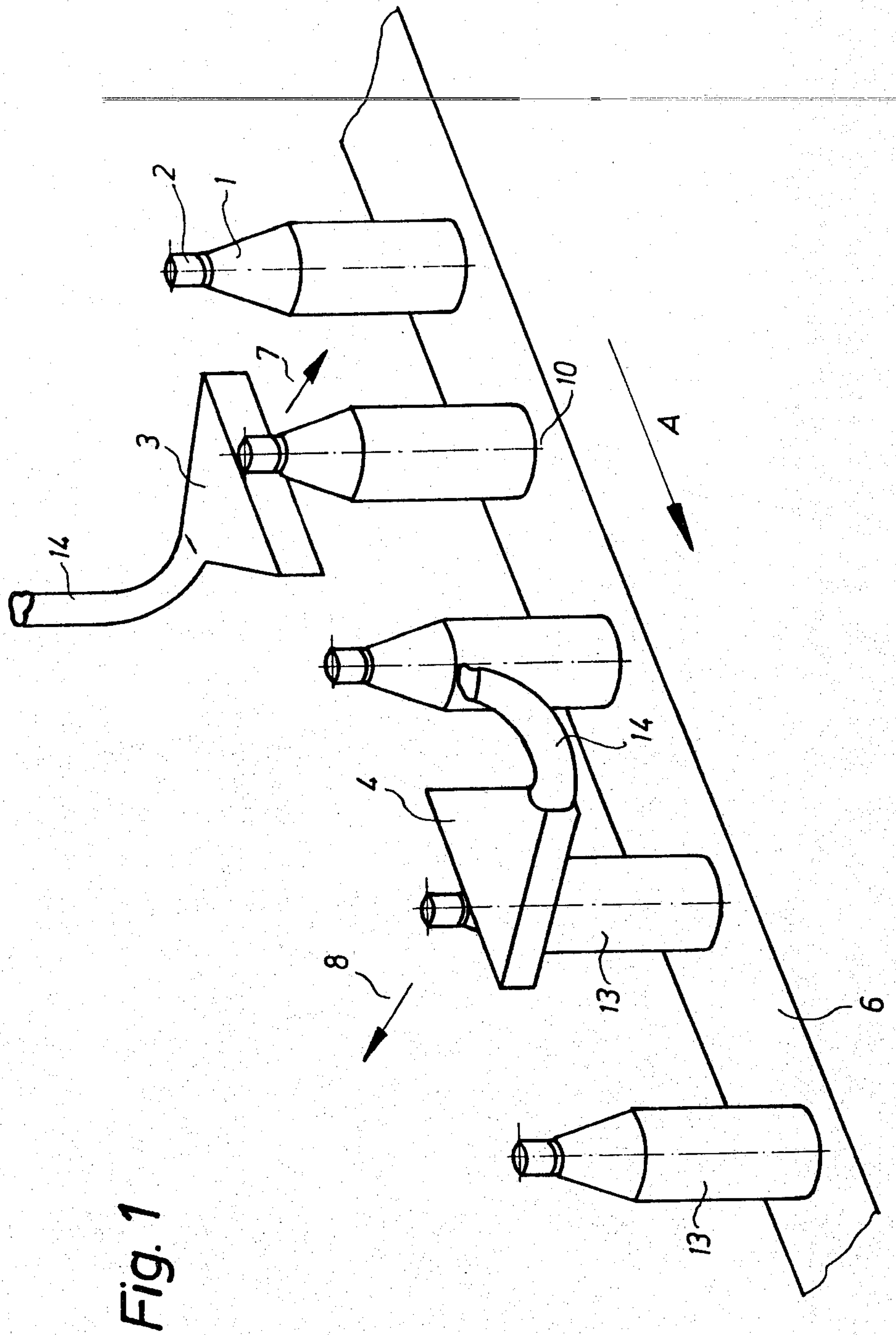

The invention relates to a method and apparatus for shrinking a closure cap of plastic material on to the mouth of a container.

In methods of this kind, a guarantee strip which is provided on the closure cap is generally shrunk on to the mouth of the container, by means of heat deformation. This operation results in the container having a guarantee closure, as the guarantee strip is torn off when the closure cap is opened for the first time. Very high rates of operation can be achieved with this method. Whereas, when using older equipment, the guarantee strip which had been raised in temperature still had to be pressed against the mouth of the container with a special tool, it is nowadays possible for the guarantee strip to be shrink-fitted on to the mouth of the container simply under the influence of pressure and heat.

Such an arrangement is disclosed for example in the present applicants' DOS (laid-open application) No. 28 52 151. In that arrangement, a hot jet of gas is directed on to the closure cap from one side, over a given distance, while the bottle itself is rotating about its own axis. A similar shrink-fitting apparatus which however is not used for bottle closures but for fitting shrink sleeves or rings on bottles, is described in U.S. Pat. No. 4,011,122. In that arrangement, slot-type nozzles which are directed towards each other are arranged on both sides of the direction of movement of the bottles, for shrinking a sleeve or ring on to the body of the bottle. Similar arrangements are also used for shrink-fitting of closure caps.

A disadvantage of this known method is that it is necessary for the bottles to be rotated about their own axis. In the arrangement which uses nozzles which are directed towards each other from two sides, the temperature and pressure pattern is relatively disadvantageous. As the two gas jets are directed towards each other, there is a pressure build-up and stagnation area in the region where the gas jets impinge upon each other, and this results in an increase in the consumption of energy. Therefore, the problem of the present invention is to overcome the disadvantages of the known art and to provide a method of the above-indicated kind, which can be used to shrink closure caps on to the mouths of containers, with a low level of energy consumption, without any necessity for the bottles to be rotated about their own axis. A further problem of the invention is to provide an apparatus for carrying out the method, which is of maximum simplicity and which can be integrated into the general filling and closure procedure of a filling line.

According to the invention, this problem is solved in that the mouth of the container is first closed by the closure cap in per se known manner, and that the closure cap is then acted upon by means of hot jets of gas from at least two nozzles alternately in such a way that the gas jets impinge on the closure cap in a temporally and/or spatially displaced mode, wherein the direction of flow of at least two of the gas jets which occur in succession in respect of time or space is different.

It will be seen that, by virtue of the closure cap being subjected to the action of the hot gas alternately from two different directions, the guarantee strip which is to be shrunk is sufficiently heated over its entire periphery to cause a shrinkage action. As the nozzles operate alternately and thus two gas jets cannot impinge against each other, there is no pressure build-up and accumulation, and this has an advantageous effect on the temperature pattern.

The method is operated in a particularly simple and rational mode if the mouth of the container is moved past at least two nozzles which are arranged on both sides of a feed path. This means that the speed of operation which is preset by the remaining equipment of the container filling line does not have to be reduced. The containers move past the nozzles on a conveyor means, and the nozzles alternately apply a jet of hot gas to the closure cap of each container. In some situations of use however, it would also be possible for the nozzles to be moved past the mouths of the containers.

If the jets of gas are displaced at about 180° relative to each other, the gas jet impinges on the closure cap on both sides in a substantially uniform manner.

An apparatus for carrying out the method is particularly simple to produce if at least one nozzle for acting on the closure cap is arranged on each side of the feed path, and if the flow axes of the nozzles are displaced relative to each other. By virtue of the flow axes of the nozzles being displaced relative to each other, the nozzles can operate continuously on both sides of the feed path, without undesirable pressure build-up and stagnation effects occurring. The flow of the jet of gas from each nozzle goes unimpededly towards the mouth of the container. In principle, the direction in which the flow axes are displaced relative to each other is of no significance. The arrangement of the nozzles also depends in particular on the nature and configuration of the feed path. It is particularly advantageous however for the nozzles to be arranged in the same plane so that the containers can be moved horizontally past the nozzles.

Figure 2:
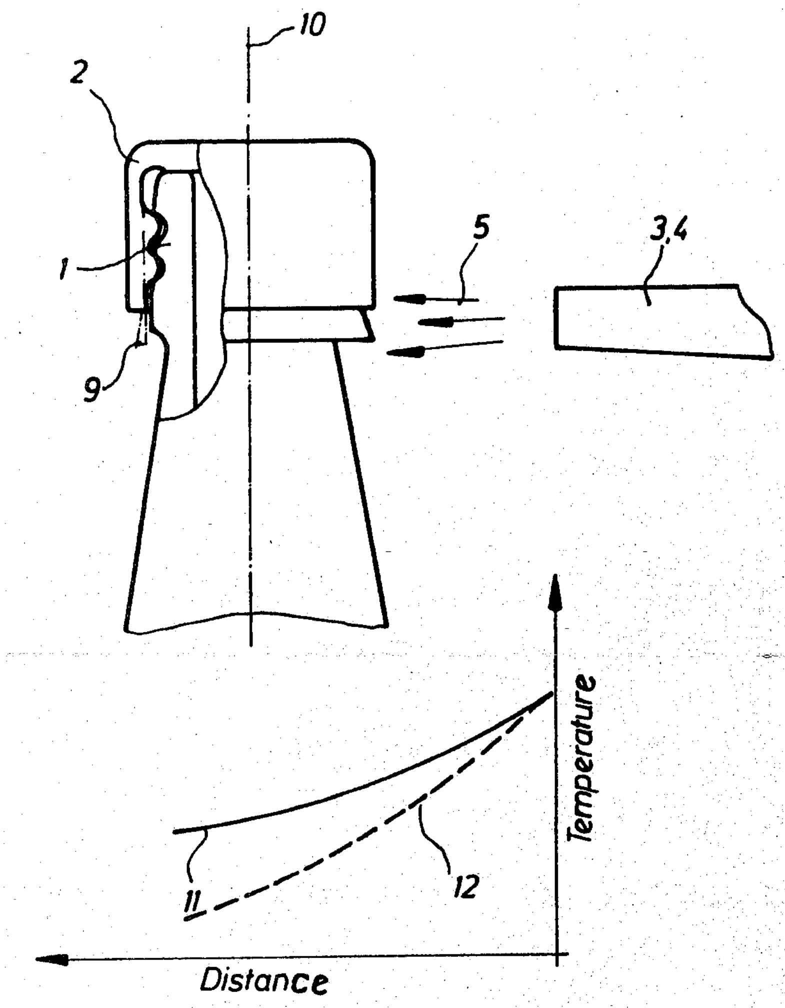

An embodiment of the invention is described in greater detail hereinafter and is illustrated in the drawings in which:

FIG. 1 shows a diagrammatic view of an apparatus according to the invention, and FIG. 2 shows a side view of the mouth of a container, also showing the temperature pattern at the nozzle.

Referring to FIG. 1, a plurality of containers 13 are continuously advanced in the direction indicated by arrow A on the feed path 6. The feed path 6 is for example a conveyor belt or any other suitable conveyor means. The screw caps 2 which comprise plastic material have already been screwed or fitted on to the mouths 1 of the containers. A respective nozzle 3 and 4 of slot-type configuration is arranged on each side of the feed path 6. The nozzles 3 and 4 are supplied with a hot gas under pressure from a blower (not shown), by way of a delivery conduit 14. The nozzles preferably operate with hot air.

As shown in FIG. 2, on their underside the closure caps 2 have a guarantee strip 9 which is shrunk on to the mouth 1 of the container by means of the jet 5 of hot gas issuing from the nozzle 3 or 4. However, the method according to the invention can also be used in a particularly advantageous manner for shrinking any other thermoplastically deformable closure caps or sleeves on to the mouths of bottles.

When the closure caps 2 pass the shrinking apparatus, the caps 2 are first acted upon by hot air from the first nozzle 3. The flow axis of the nozzle 3 extends approximately perpendicularly both to the axis 10 of the container and also to the feed path 6. When a container has passed nozzle 3, the guarantee strip is already fully shrunk on the side which is towards the nozzle 3, while the shrinking process has not yet been completely concluded, on the side of the cap which is remote from the nozzle 3.

As the containers 13 continue their forward movement on the feed path 6, they pass a nozzle 4 which is arranged on the other side of the feed path and which is of basically the same design as the first nozzle 3. However, the flow direction of the nozzle 4 is precisely opposite to the flow direction of the nozzle 3. In this arrangement, as shown in FIG. 1, the flow axis 8 is arranged at a displaced position relative to the flow axis 7. Both nozzles 3 and 4 are disposed approximately in the same horizontal plane. The jet of hot air issuing from the nozzle 4 causes a guarantee strip which has been partially shrunk on to the mouth of the container by means of the nozzle 3, to be finally shrunk on to the container mouth. Depending on the material used for the closure cap and on the speed of movement of the containers 13 on the conveyor path 6, any desired number of nozzles may be arranged alternately on both sides of the feed path 6. The method according to the invention can in principle also be carried out with the equipment which already exists at the present time, in which the nozzles on both sides of the feed path 6 are disposed opposite to each other or in which the flow axes are directed towards each other. In that case however it is necessary to provide suitable control means so that only one nozzle operates alternately at a time, so that there cannot be any pressure build-up and stagnation.

FIG. 2 also shows in diagrammatic form the temperature pattern of the hot gas jet 5 which issues from the nozzles 3 and 4. Curve 11 shows the temperature pattern with the method according to the invention, while curve 12 shows a somewhat more disadvantageous temperature pattern, which occurs with the conventional nozzles which are directed towards each other and which operate simultaneously. It will be seen that the temperature is at its highest directly at the nozzle opening, and decreases with increasing distance from the nozzle opening. When using nozzles which are directed towards each other at the same height and which operate simultaneously, the gas flows 5 which impinge upon each other result in a pressure build-up and stagnation approximately in the plane of the axis 10 of the containers. This pressure build-up and stagnation effect is a hindrance in respect of the flow pattern and the flow speed so that the temperature when the gas reaches the screw cap 2 is then only at a low level, as shown by curve 12. When using nozzles which operate alternately or nozzles which operate continuously with displaced flow axes, this disadvantage does not occur. The gas jet 5 impinges on the guarantee strip without hindrance and at high speed, so that the gas jet is still at a comparatively high temperature when it impinges on the guarantee strip. In this way, the nozzles 3 and 4 may be operated with a significantly lower level of heating output. As apparatuses of this kind in the drinks industry operate uninterruptedly on a shift-work basis, savings of this kind are of major significance from the point of view of economy of the entire plant.

I claim:

1. A method of generally symmetrically shrinking a generally cylindrical portion of a closure cap of plastic material on to the generally cylindrical mouth of a container, characterised in that the mouth (1) of the container is first closed by the closure cap (2), and that the closure cap is then acted upon by means of hot jets of gas (5) from at least two nozzles (3, 4) alternately in such a way that the gas jets impinge on the closure cap in a temporally and/or spatially displaced mode and do not impinge on each other, wherein the direction of flow of at least two of the gas jets which occur in succession in respect of time or space is different so as to impinge on different portions of the same periphery of said closure cap.

2. A method according to claim 1 characterised in that the mouth (1) of the container is moved relatively past at least two nozzles which are arranged on both sides of a feed path (6).

3. A method according to claim 1 or claim 2 characterised in that the directions of flow of the two successive gas jets are arranged so as to be displaced at about 180° relative to each other.

4. A method as claimed in claim 1 wherein said container is a bottle and said closure is a generally cylindrical cap.

5. A method as claimed in claim 1 wherein said container has a threaded mouth, and said closure is a screw cap.

6. A method according to claim 1 wherein the nozzles are substantially coplanar.

7. Apparatus for shrinking a closure cap of plastic material onto the mouth of a bottle, comprising means for successively presenting along a path a series of bottles with plastic closure caps mounted on the mouths thereof, and at least two nozzle means for alternately impinging hot gas jets on each closure cap in a temporally and/or spatially displaced mode such that the hot gas jets do not impinge upon each other, the direction of flow of at least two of the gas jets which act in succession in respect of time or space being different so as to impinge on peripherally spaced different portions of the same periphery of each closure cap.

8. Apparatus as claimed in claim 7 wherein at least one nozzle means is arranged on each side of said path.

9. Apparatus as claimed in claim 8 wherein said at least one nozzle means on one side of the path has its flow axis displaced relative to the flow axis of the nozzle means on the other side of the path.

10. Apparatus as claimed in claim 9 wherein said nozzle means are disposed at least approximately in the same horizontal plane.

* * * * *